(12) United States Patent
Jülg

(10) Patent No.: US 6,236,673 B1
(45) Date of Patent: May 22, 2001

(54) RECEIVER FOR RECEIVING SIGNALS OF A STATELLITE NAGIVATION SYSTEM

(75) Inventor: Thomas Jülg, Finning (DE)

(73) Assignee: Deutsches Zentrum fur Luft-und Raumfahrt E.V., Bonn (DE)

( * ) Notice: Subject to any disclaimer, the term of this patent is extended or adjusted under 35 U.S.C. 154(b) by 0 days.

(21) Appl. No.: 09/048,315

(22) Filed: Mar. 26, 1998

(30) Foreign Application Priority Data

Mar. 26, 1997 (DE) .............................................. 197 12 751

(51) Int. Cl.[7] .............................. A61F 2/06; H04L 27/30

(52) U.S. Cl. ............................................................ 375/150

(58) Field of Search .................................... 375/130, 140, 375/141, 142, 150, 343, 362, 367, 371; 370/503, 515, 516, 517, 519; 455/3.2, 427, 430

(56) References Cited

U.S. PATENT DOCUMENTS

| | | |
|---|---|---|
| 4,689,626 | * 8/1987 | Hori et al. . |
| 4,701,934 | 10/1987 | Jasper . |
| 4,785,463 | 11/1988 | Janc et al. . |
| 5,953,367 | * 9/1999 | Zhodzicshsky et al. . |

FOREIGN PATENT DOCUMENTS 3601576 7/1987 (DE) .

OTHER PUBLICATIONS

P. Fenton et al., "NovAtel's GPS receiver—the high performance OEM sensor of the future", pp. 49–58 (1991).

A. Van Dierendonck et al, "Theory and performance of narrow correlator spacing in a GPS receiver", pp. 115–124 (1992).

\* cited by examiner

*Primary Examiner*—Chi Pham
*Assistant Examiner*—Jean B. Corrielus
(74) *Attorney, Agent, or Firm*—Browdy and Neimark

(57) ABSTRACT

To receive signals of a satellite navigation system that have been band-spread with a PN (Pseudo-Noise) sequence, a receiver is provided in which signal travel times are determined for deriving the distance from satellites. Further included in the receiver is a time-shift control loop, that is, a so-called Delay-Locked Loop (DLL) for performing a tracking synchronization of a locally-generated carrier-frequency signal and cycle and a PN code that is identical to the PN code transmitted from the satellite, the loop having two correlators, of which the one is supplied with a PN sequence that precedes the received PN sequence by one cycle time, or a fraction thereof, and the other is supplied with a PN sequence that follows the PN sequence symmetrically, and the subtracted results are used as a difference cross-correlation function for controlling the voltage-controlled oscillator. The difference cross-correlation function is a function of the relative position of the locally-generated PN sequence with respect to the received PN sequence, and represents a doubled triangular function with a discriminator characteristic, which is a synthetically-generated, linear connection between the maximum and minimum values of the difference correlation function.

6 Claims, 13 Drawing Sheets

RECEIVER FOR RECEIVING SIGNALS OF A STATELLITE NAGIVATION SYSTEM

FIELD OF THE INVENTION

The invention relates to a receiver for receiving signals of a satellite navigation system.

REVIEW OF RELATED TECHNOLOGY

In performing high-precision positioning tasks with the aid of the GPS (Global Positioning System) satellite navigation system, it has been found that multi-path propagation of a satellite signal is the most common source of errors in measurements of signal travel time and carrier phase. Due to scattering and reflection of electromagnetic waves by obstacles, the waves are disturbed at the receiving site (e.g., at the antenna of a GPS locator device), which can result in amplification or attenuation of the receiving-field intensities. If either the transmitter or receiver moves, or even if both move, the changes in receiving-field intensities vary over time, leading to time-varying interferences. Controlling the effects of these interferences is crucial in positioning tasks accurate to the centimeter range, for example in an instrument takeoff and landing system for aircraft or a vehicle's steering system.

In principle, the relative time shift of two arbitrary signals can be calculated or measured with a cross-correlation function. Satellite navigation systems employ so-called pseudo-noise signals, which appear at first glance to be purely random but are actually strongly deterministic. If a cross-correlation is formed between a received satellite navigation signal and an identical pseudo-noise signal generated in the receiver, the so-called pseudo-signal travel time $t_m$ can be measured.

The pseudo-signal travel time differs from the real signal travel time between the satellite and the receiver by the offset of the satellite time from the receiver time. If the two clocks (e.g., clocks in the GPS satellite and in the ground locating device receiver) were coherently coupled, the pseudo-signal travel time would be identical to the real signal travel time. If a last pseudo-travel time measurement $t_{m-1}$ is known, a tendency (or, trend) of the time shift between the received signal and the signal generated in the receiver can be identified.

This tendency toward change is necessary for taking into account the Doppler-frequency shift in the pseudo-noise signal $C_i^{(CA.e)}(t)$ generated in the receiver, with (CA.e) (Coarse/Acquisition) representing the GPS pseudo-noise code generated in the receiver and accessible to the civilian user. Otherwise, the decorrelation of the two pseudo-noise signals would increase and, in the worst case, a correlation would no longer be identified, necessitating a new, time-consuming search.

Therefore, to take into consideration the Doppler-frequency shift, a variably-actuatable oscillator must be used in generating the internal pseudo-noise signal $C_i^{(CA.e)}(t)$. This job can be performed, for example, with a voltage-controlled oscillator that actuates the internal signal generation.

For adjusting the Doppler-frequency shift, GPS receivers and other spread-band multiplex receivers use only a time-shift control loop (DLL or Delay Lock Loop) from analog technology (FIG. 1). The control loop (DLL) suppresses or regulates disturbances in the receiving signal, for example due to movement of the satellite or the receiver.

The DLL includes a characteristic property, the "discriminator characteristic", which determines its functioning.

In the DLL of FIG. 1, the controller characteristic is generated by a unit 10, which generates the C/A code and modulates three signals with this internal pseudo-noise. One is the on-time pseudo-noise signal $C_i^{(CA.e)}(t)$. In addition, two further pseudo-noise signals are present that only differ from $C_i^{(CA.e)}(t)$ in their symmetrical, temporal shift $t_v$. Here $C_i^{(CA.e)}(t-t_v)$ precedes the on-time pseudo-noise signal by $t_v$, and $C_i^{(CA.e)}(t+t_v)$ follows by $t_v$. The pseudo-noise signals that are modulated and sampled with the intermediate frequency ZF are indicated by $S_i^{a(CA.ZF.e)}(t-t_v)$ and $S_i^{a(CA.ZF.e)}(t+t_v)$. In a first correlator (11), the cross-correlation function $$\chi_f^{(CA.ZF.se)}(\tau) = \frac{1}{T}\sum_{m=0}^{\frac{T}{\Delta t}} S_i^{a(L_1.CA.ZF.s)}(m\Delta t)S_i^{a(CA.ZF.e)}(m\Delta t - t_v - \tau) \quad (1)$$

is formed for the early pseudo-noise signal, and the cross-correlation function $$\chi_s^{(CA.ZF.se)}(\tau) = \frac{1}{T}\sum_{m=0}^{\frac{T}{\Delta t}} S_i^{a(L_1.CA.ZF.s)}(m\Delta t)S_i^{a(CA.ZF.e)}(m\Delta t + t_v - \tau) \quad (2)$$

for the late pseudo-noise signal is formed in a second correlator (12). T represents the chip duration, $\Delta t$ represents the time offset, s the received signal and e the signal generated in the receiver, and $L_1$ a first GPS carrier frequency in the L band, while m represents multiples of the sampling interval, and a indicates that the signal is discrete.

Correlator 11 further includes a first multiplier 111, a filter 112, and a second multiplier 113; correlator 12 includes analogous elements 121, 122, and 123. The illustrated correlators are exemplary, and any means for correlating the signals is contemplated by the present invention.

The inversion of one of the two cross-correlation functions in an inverter 13 and subsequent addition in an adding element 14

$$\chi^{d(CA.ZF.se)}(\tau)=\chi_f^{(CA.ZF.se)}(\tau)-\chi_s^{(CA.ZF.se)}(\tau) \quad ((3)$$

generates a summation signal which is the raw discriminator characteristic that is illustrated in FIG. 2 for an ideal case. In a real case, higher frequency components occur in the formation of the cross-correlation function due to correlation at the intermediate frequency and the shape of FIG. 2 is the envelope of a correlation fine structure whose amplitude limits form the envelope. The cross-correlation according to Equation (3) must therefore be smoothed with a low-pass filter function before it can be used for control the phase shift. This is done in low-pass filter 15.

The low-pass filter 15 is also called a "loop filter"; its design, as well as the time shift $t_v$ between the early and the late pseudo-noise signals, essentially determines the dynamic properties of the entire DLL.

A voltage-controlled oscillator 16, which supplies the frequency for the internal pseudo-noise signal generator 10, can be actuated with the smoothed difference $\chi^{(CA.ZF.se)}$ between the early and the late cross-correlation function $\chi^{(CA.ZF.se)}(\tau)$. If the DLL is locked in, the internally-generated pseudo-noise signal is maintained exactly synchronous with the received pseudo-noise signal.

In the locking process, the Doppler-frequency shift is determined with a search method. Without a priori knowledge, this search process usually lasts 15 to 20 minutes. If the approximate receiver and satellite coordinates are known, the search process can be limited, and lasts only about two to three minutes.

If only the receiver or transmitter moves, this results in a change in the Doppler frequency of the received signal. This also changed the temporal relationship of the received pseudo-noise signal and the internally-generated pseudo-noise signal. If the received signal precedes the internally-generated signal, the clock rate of the internal signal is increased until the two codes again match exactly. If the received signal follows the internal signal in time, however, the clock rate is correspondingly reduced until exact synchronization is attained.

The synchronicity of the internal pseudo-noise signal and the received signal is used to measure the pseudo-signal travel time $t_m$ and to decode data. For measuring the pseudo-signal travel time $t_m$, corresponding measuring pulses must be derived from the internal pseudo-noise signal and the receiver oscillator so that the temporal difference between them can be determined with a time-interval measuring device.

A typical embodiment involves consistent generation of a pulse signal at the beginning of the internal code from which the pseudo-noise signal is formed. The pseudo-signal travel time $t_m$ then is the difference between the two pulses. Of course, this measured value does not correspond to the true signal travel time between the satellite and the receiver, because the receiver oscillator is not synchronized with the satellite oscillator. Therefore, the term "pseudo-travel time measurement" is used.

One consequence of the synchronization process of the code generated in the receiver with the received code is the fact that the internal code can only follow the received code with certain dynamics. Disturbances in the received signal, for example due to multi-path propagation, therefore lead to errors in the pseudo-signal travel time measurements $t_m$. The magnitude of the error caused by this is a function of the dynamics of the DLL, among other things.

Thorough studies of the influence of the time shift $t_n$ between on-time and shifted codes of the DLL have already been conducted with respect to errors due to multi-path signal propagation. These studies revealed that the influence of the multi-path propagation in the pseudo-signal travel time $t_m$ can also be reduced by the reduction in the time shift $t_n$.

The following value for the time shift was proposed by Fenton, P., et al in Novatel's GPS Receiver, The High Performance OEM Sensor of the Future, Albuquerque, Institute of Navigation, Proceedings of GPS 91, Conference (1991) and by Van Dierendonck, A.; Fenton, P., and Fort, T. in Theory and Performance of Narrow Correlator Spacing in a GPS Receiver, San Diego, Institute of Navigation, Proceedings of the National Technical Meeting (1992):

$$t_v f^{(CA)} = 0.05 \ldots 0.1 \quad (4)$$

With this value, the errors caused by multi-path propagation of the satellite signal can be reduced by approximately 90% in comparison to a standard DLL with $$t_v f^{(CA)} = 1.0 \quad (5)$$

DLL's having the shift range predetermined in Equation (4) are also known by the English term "narrow spacing correlator."

The reduced shift range also decreases the range of the discriminator characteristic, and therefore the control range. This is shown, for an ideal case, in FIG. 3; the reduced control range appears on the vertical axis. The case $t_v=0.5$ Bit appears in both FIG. 2 and FIG. 3. The reduced control range leads to the negative feature of reduced dynamics of these DLL's. Receivers having such control loops unlock faster when disturbances occur. In individual receivers, disturbances can even excite the DLL to oscillate, as verified by the studies. The multi-path error is also a function of the frequency of the pseudo-noise signal; a frequency ten times higher effects a multi-path error that is smaller by a factor of 10.

SUMMARY OF THE INVENTION

Accordingly, the present invention has an object, among others, to overcome deficiencies in the prior art such as noted above.

It is therefore the object of the invention to make a received satellite navigation signal immune to multi-path propagation for high-precision travel time measurements with a satellite navigation signal.

This object is accomplished by the discriminator characteristic of the DLL not being generated directly, but synthetically as a connection between the maximum and minimum values of the correlation function. The synthetic generation determines only the position of the maximum value of the envelopes of the correlation function on the x axis. The slope and shape of the discriminator characteristic, and thus the sensitivity of the DLL, can be adapted to the desired dynamics. In one embodiment the loop filter 15 (FIG. 1) of the prior art is replaced by a synthetic discriminator characteristic generator; the invention includes other means for achieving synthetic generation of the discriminator characteristic.

Hence, the invention creates a DLL that is immune to multi-path propagation (Multipath Immune Delay Lock Loop, MIDLL). The influence of multi-path propagation on the travel-time measured values is therefore negligible in the use of the immune DLL.

BRIEF DESCRIPTION OF THE DRAWING

The above and other objects and the nature and advantages of the present invention will become more apparent from the following detailed description of an embodiment taken in conjunction with drawings, wherein.

DETAILED DESCRIPTION OF THE PREFERRED EMBODIMENT

Figure 1:
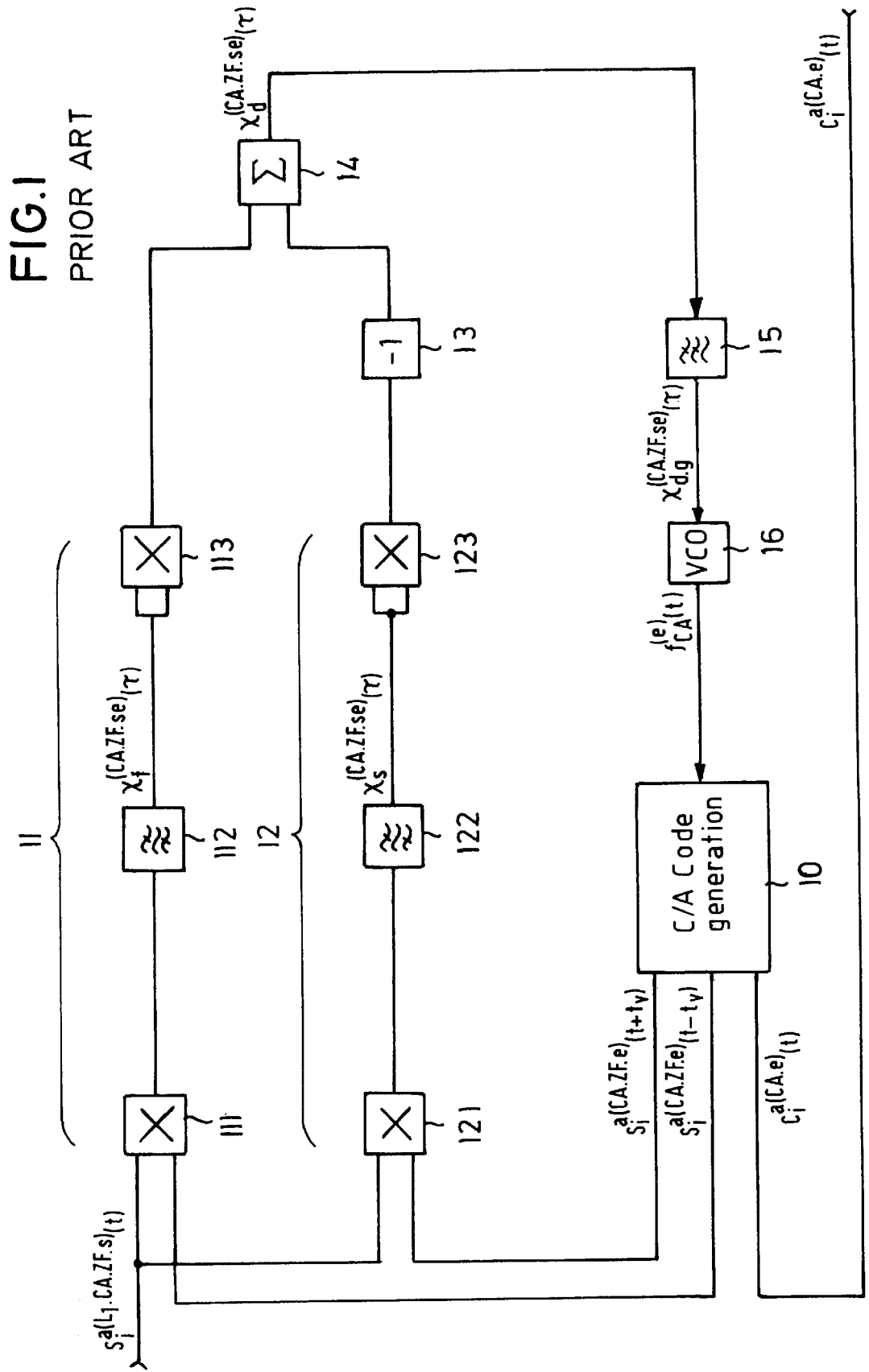
FIG. 1, labeled "prior art", is a schematic or block diagram view of a non-coherent DLL.
Figure 21:
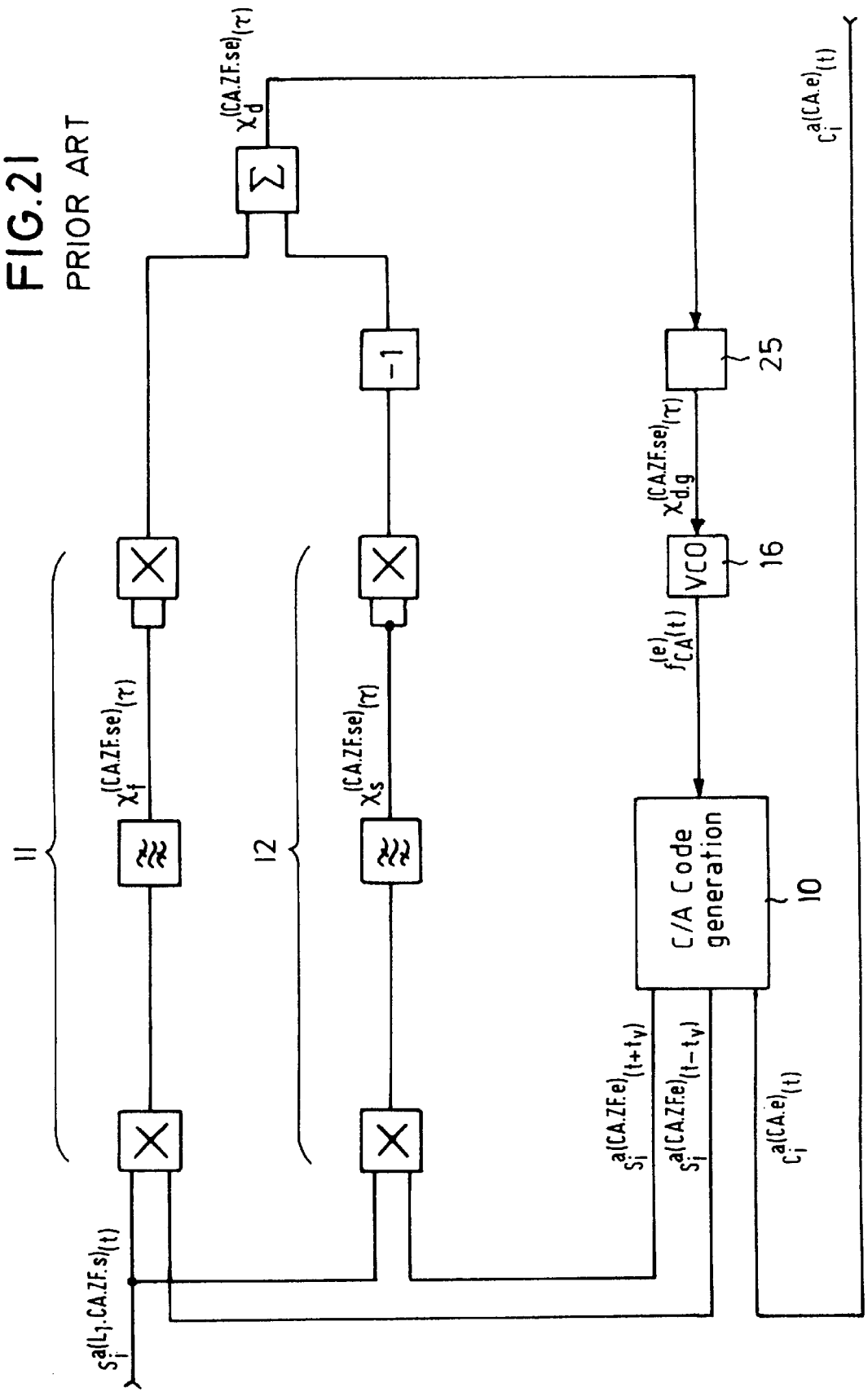
FIG. 21 is a schematic or block diagram view of a DLL according to the present invention.

FIG. 21 shows a preferred embodiment of the present invention which is similar to the prior-art DLL of FIG. 1. The low-pass "loop" filter 15 is not shown in FIG. 21. Instead, the DLL of FIG. 21 includes a synthetic discriminator characteristic generator 25, a complex unit for determination of the discriminator characteristic for controlling the VCO 16. The other circuit elements may be the same and retain the same reference numerals as in FIG. 1.

Figure 2:
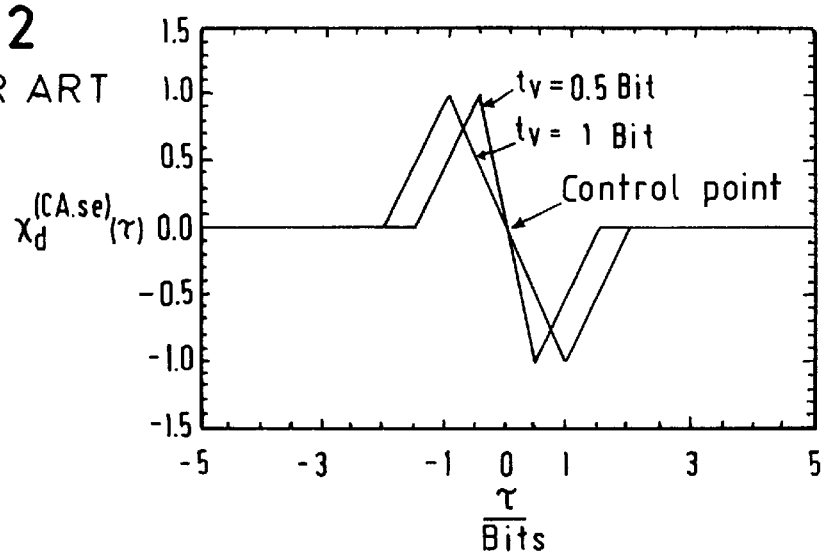
FIG. 2 labeled "prior art" is a graphical view of a discriminator characteristic for the DLL of FIG. 1 with a 0.5-bit and a 1.0-bit code shift.
Figure 3:
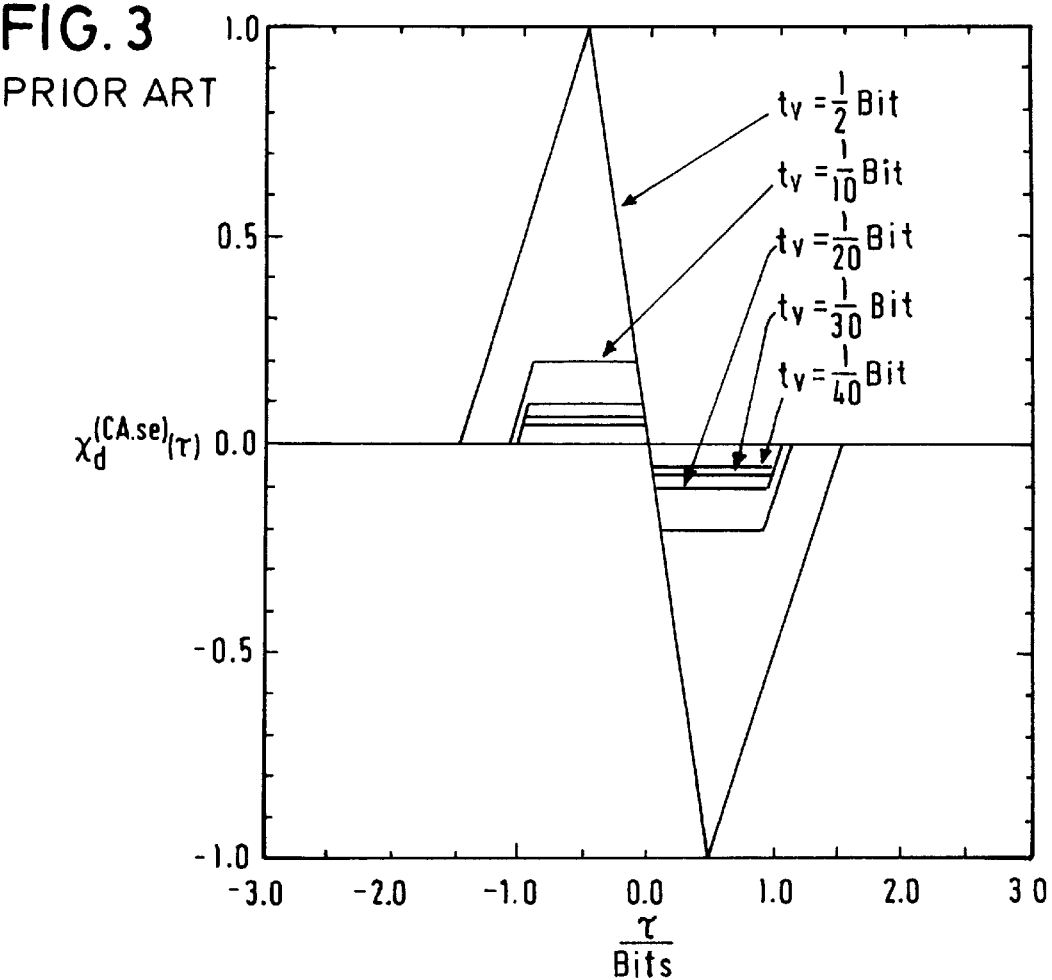
FIG. 3 labeled "prior art" is a graphical view of a diagram in which a reduction in the control range of the discriminator characteristic is represented by a reduction in the shift range with a so-called "narrow correlator" shift.
Figure 22:
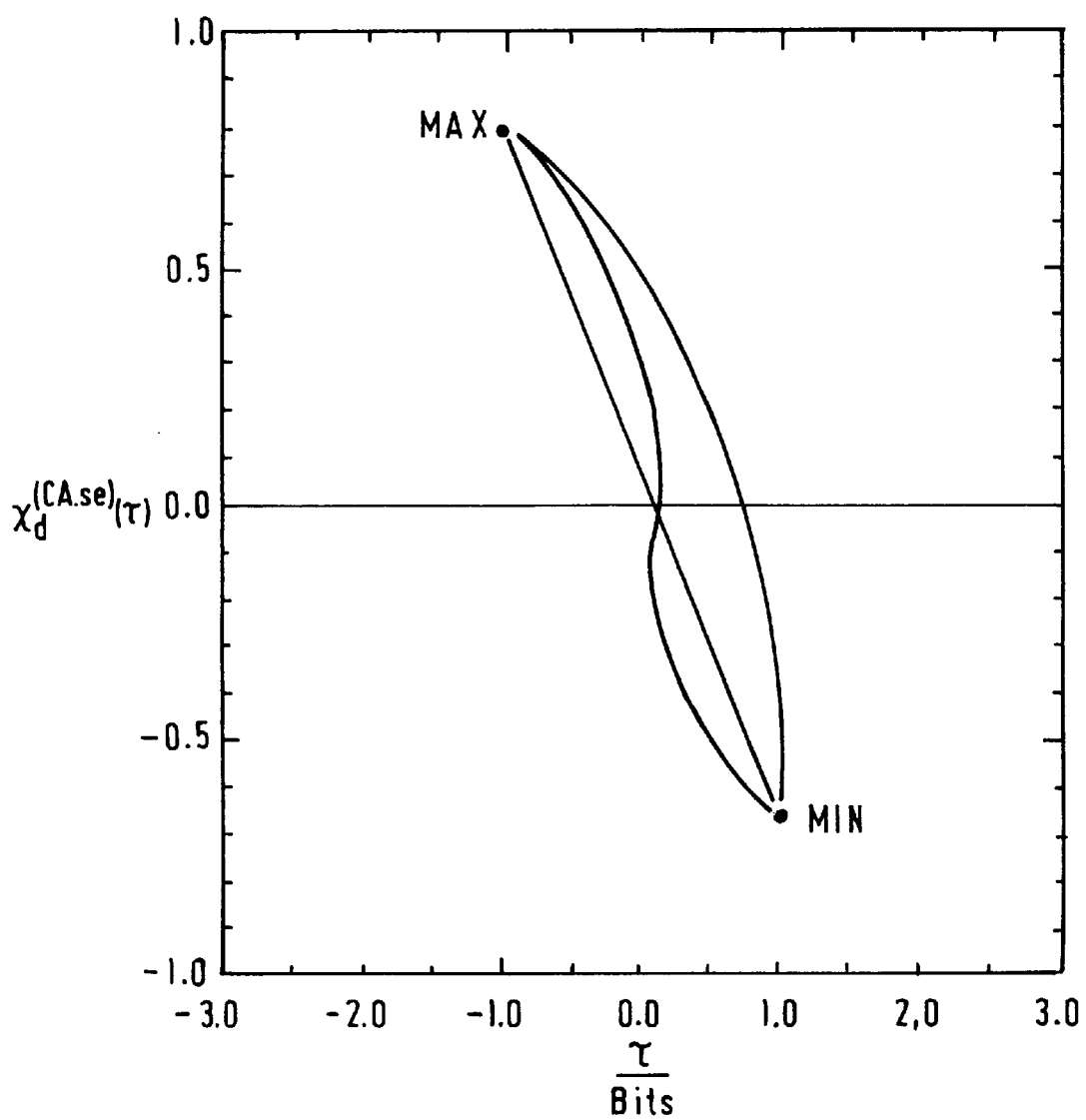
FIG. 22 is a graphical view.

The generator 25 might, for example, include digital circuitry such as a fast microprocessor which detects a local maximum value of the cross-correlation function and generates the discriminator envelope according to a predetermined curve. That is, the high and low points at the tips of the triangular shapes shown in FIG. 1 are determined by the generator 25 and these points are connected, in the same plane that is shown in FIGS. 2 and 3, by a chosen curve. In one embodiment the chosen curve is a straight line, but the invention contemplates other curves as well. Synthetic discriminator characteristic curves are shown in FIG. 22.

The maximum and minimum points through which the chosen curve passes are determined as follows: when there is a Doppler shift of the signals received from the GPS satellite, the phase shift varies. The DLL corrects the phase drift with feedback correction over a range extending from $-2.0\ \tau/\text{Bit}$ to $+2.0\ \tau/\text{Bit}$. The generator 25 includes circuits or programs for determining when the maximum or minimum occurs. As soon as these two points are noted, the generator 25 generates the chosen curve between those points. Thereafter the voltage output to the VCO 16 is the determined function of the phase shift in units of $\tau/\text{Bits}$. The bits are bits of pseudo-noise code, which are also a unit of time equal to one divided by the pseudo-noise frequency.

Like the low-pass filter 15 of the prior art, the generator 25 eliminates the carrier frequency.

Figure 10:
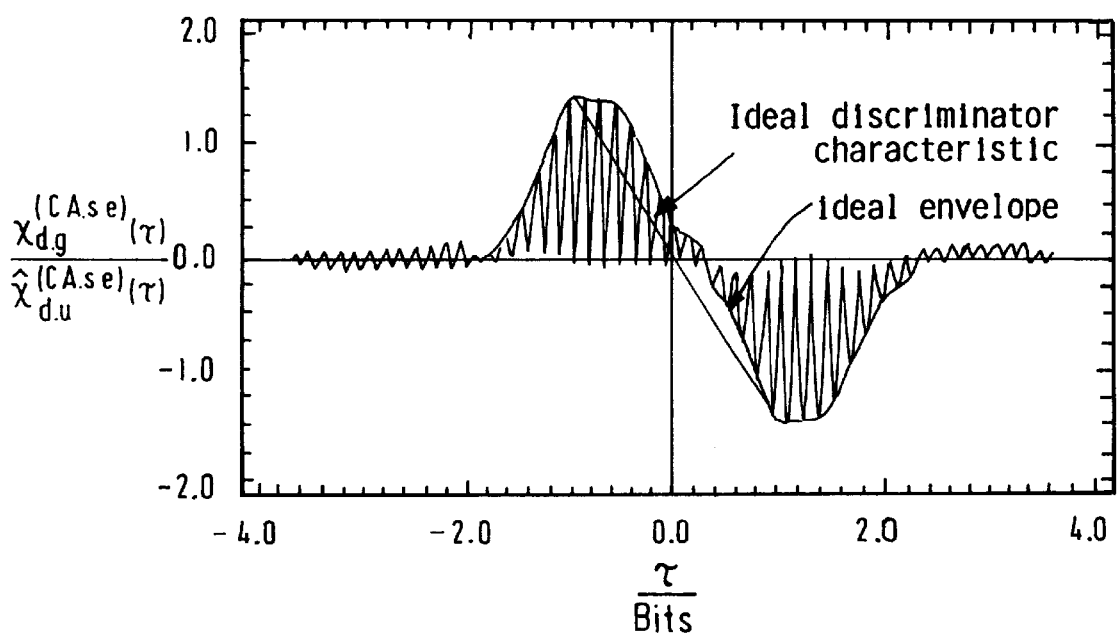
FIG. 10 labeled "prior art" is a graphical view of a discriminator characteristic of the DLL of FIG. 1 with a 0.5-bit code-phase shift and an amplitude ratio of 0.9.
Figure 11:
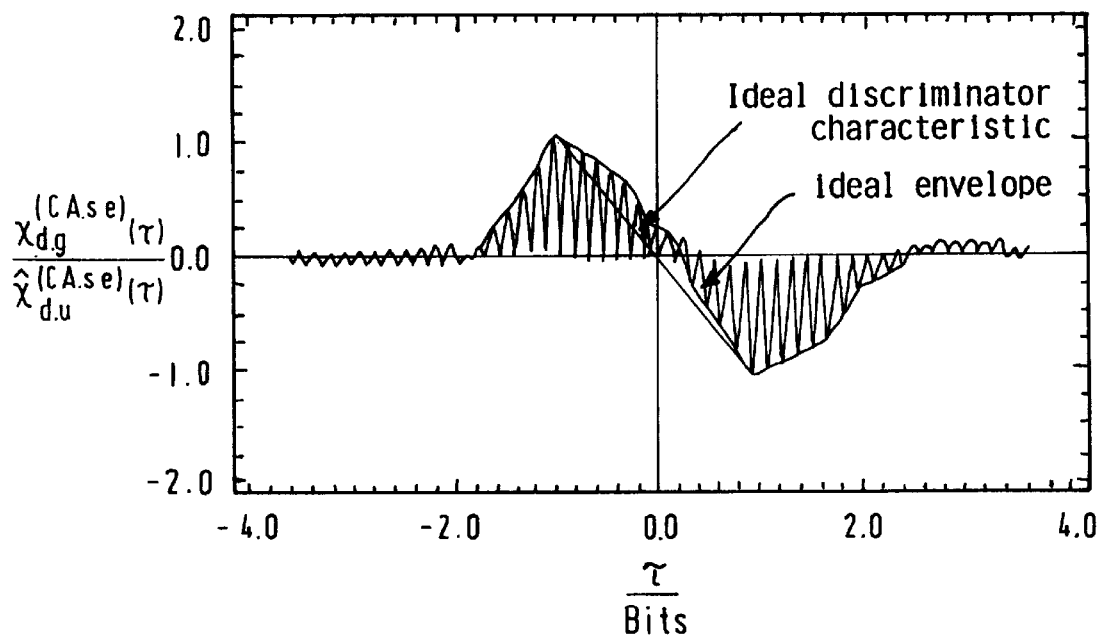
FIG. 11 labeled "prior art" is a graphical view of a discriminator characteristic of the DLL of FIG. 1 with a 0.75-bit code-phase shift and an amplitude ratio of 0.5.
Figure 12:
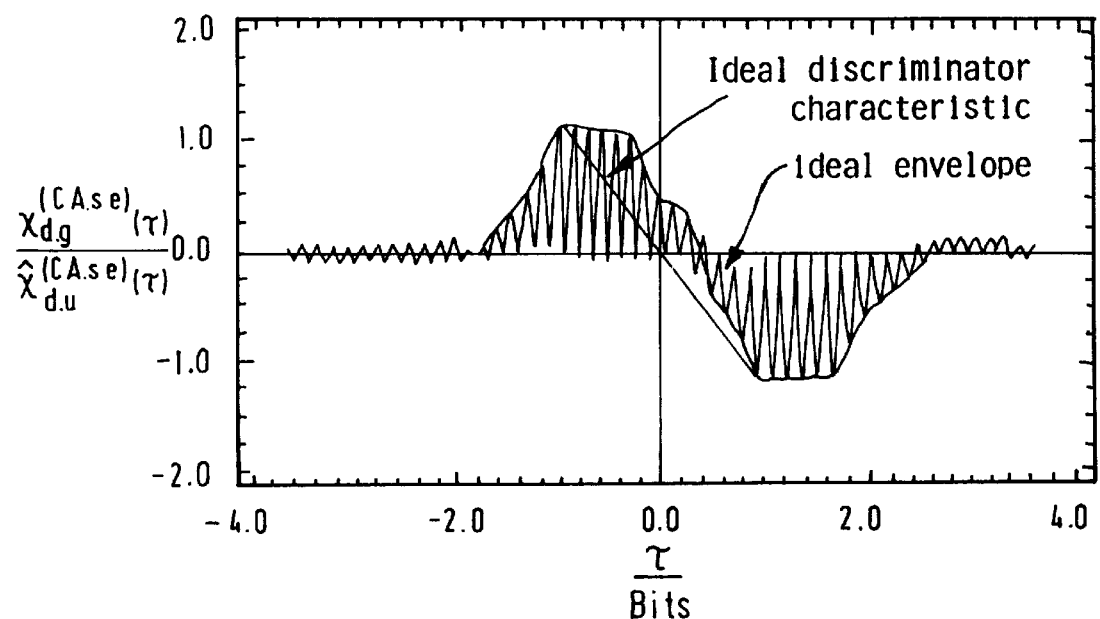
FIG. 12 labeled "prior art" is a graphical view of a discriminator characteristic of the DLL of FIG. 1 with a 0.75-bit code-phase shift and an amplitude ratio of 0.9.
Figure 13:
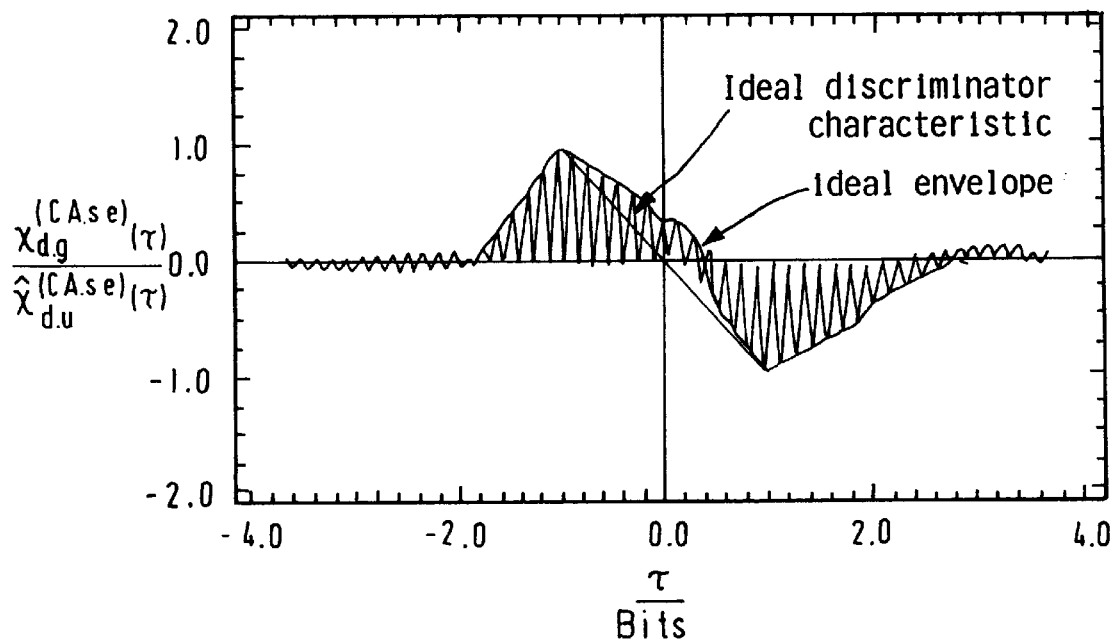
FIG. 13 labeled "prior art" is a graphical view of a discriminator characteristic of the DLL of FIG. 1 with a 0.9-bit code-phase shift and an amplitude ratio of 0.5.
Figure 14:
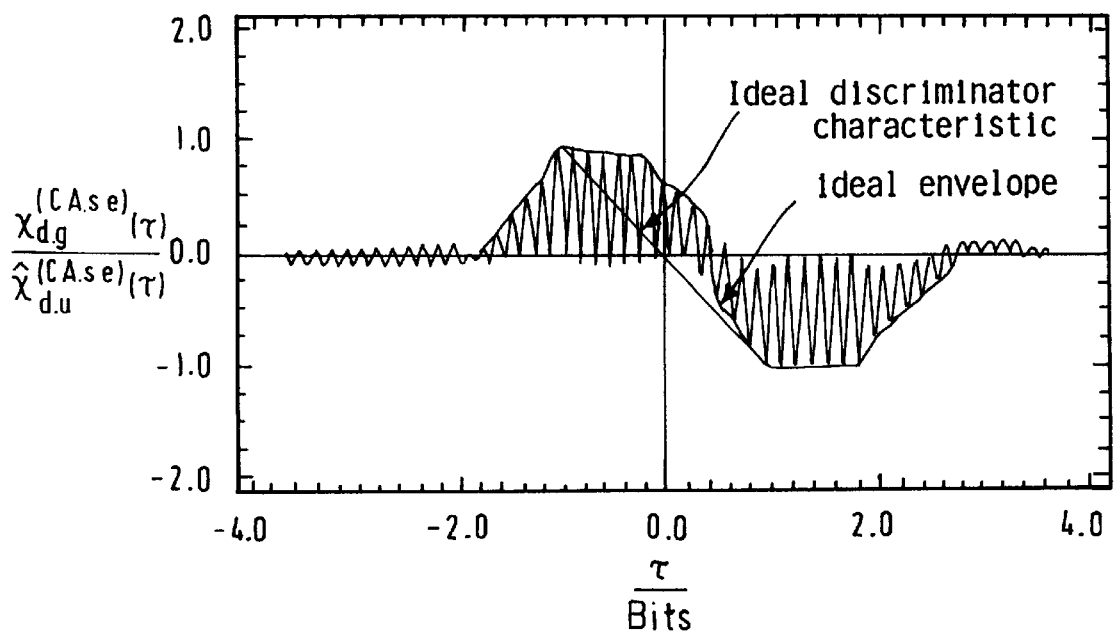
FIG. 14 labeled "prior art" is a graphical view of a discriminator characteristic of the DLL of FIG. 1 with a 0.9-bit code-phase shift and an amplitude ratio of 0.9.
Figure 15:
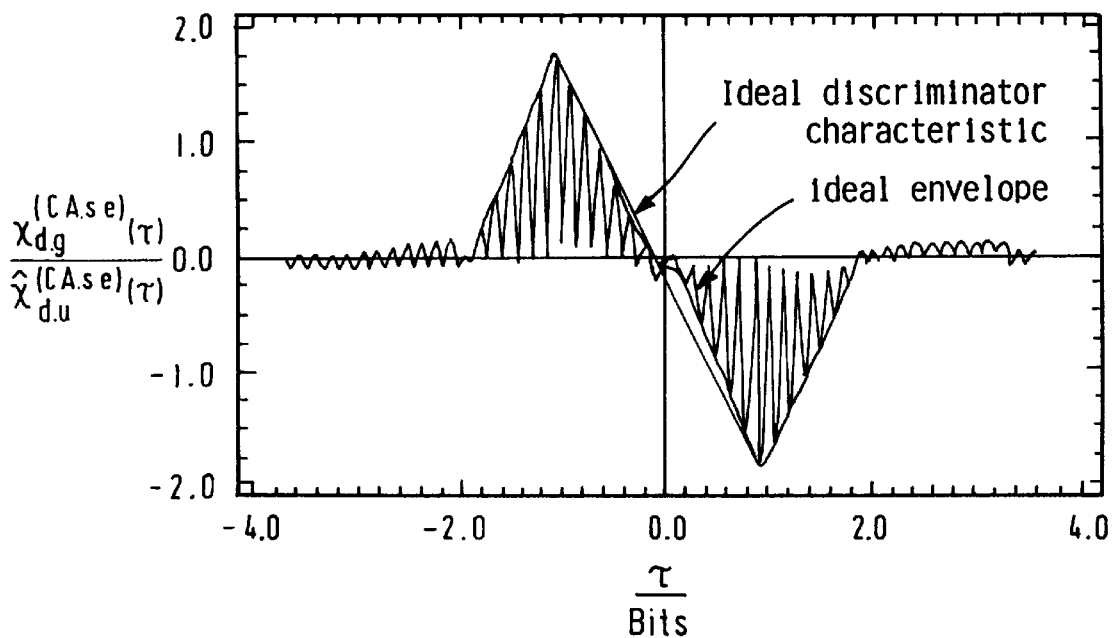
FIG. 15 labeled "prior art" is a graphical view of a discriminator characteristic of the DLL of FIG. 1 with a $\pi/5$ carrier-phase shift and an amplitude ratio of 0.9.
Figure 16:
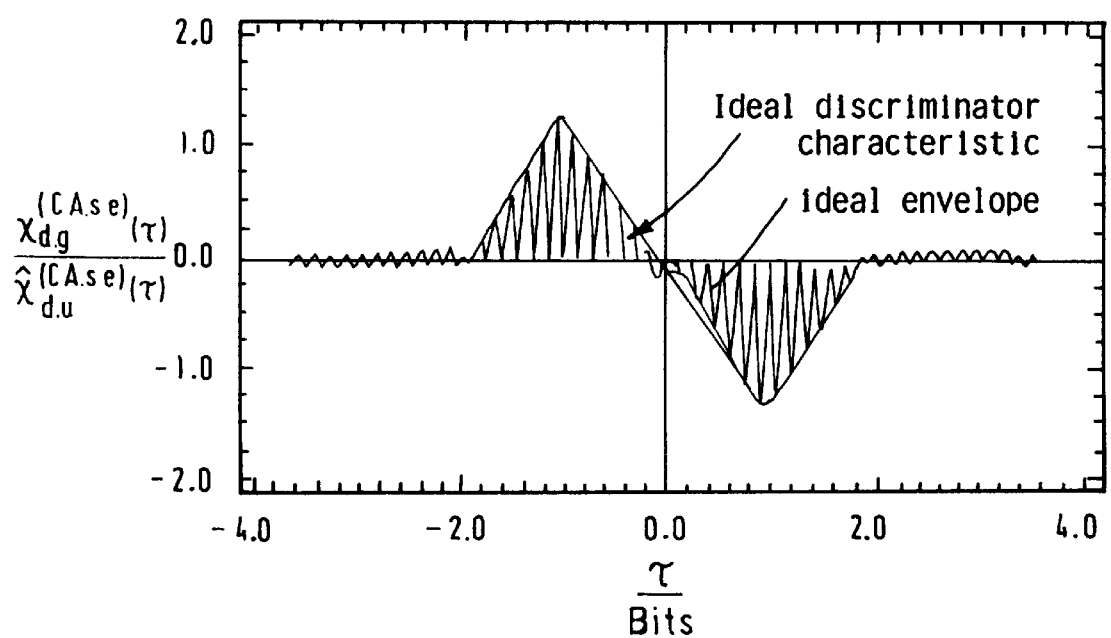
FIG. 16 labeled "prior art" is a graphical view of a discriminator characteristic of the DLL of FIG. 1 with a $\pi/2$ carrier-phase shift and an amplitude ratio of 0.9.
Figure 17:
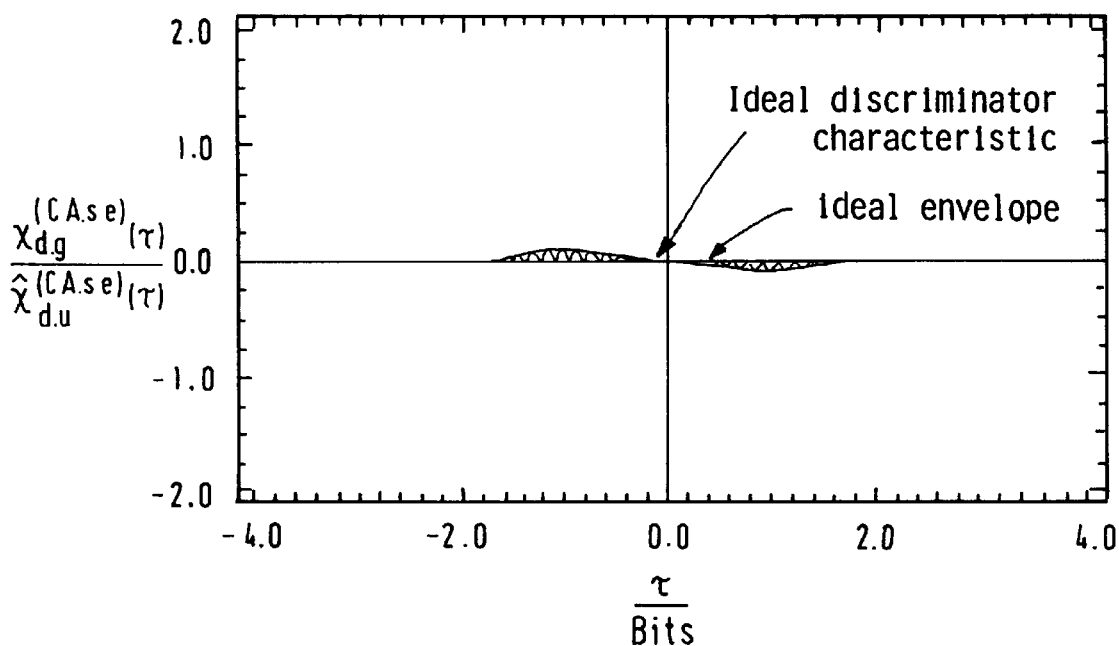
FIG. 17 labeled "prior art" is a graphical view of a discriminator characteristic of the DLL of FIG. 1 with a $\pi$ carrier-phase shift and an amplitude ratio of 0.9.
Figure 18:
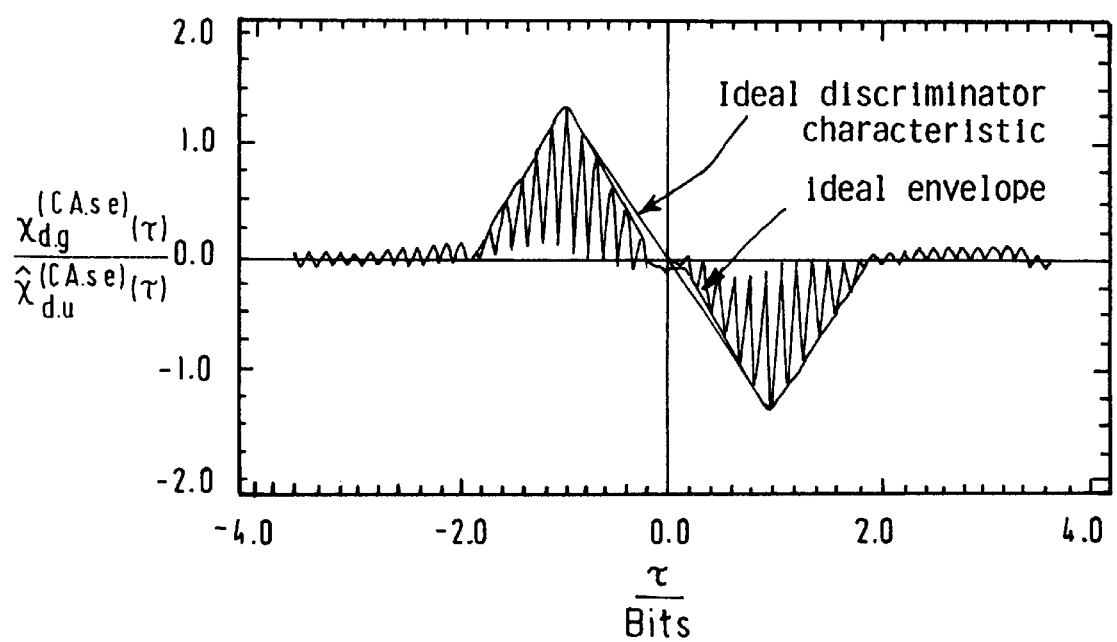
FIG. 18 labeled "prior art" is a graphical view of a discriminator characteristic of the DLL of FIG. 1 with a $3\pi/2$ carrier-phase shift and an amplitude ratio of 0.9.
Figure 19:
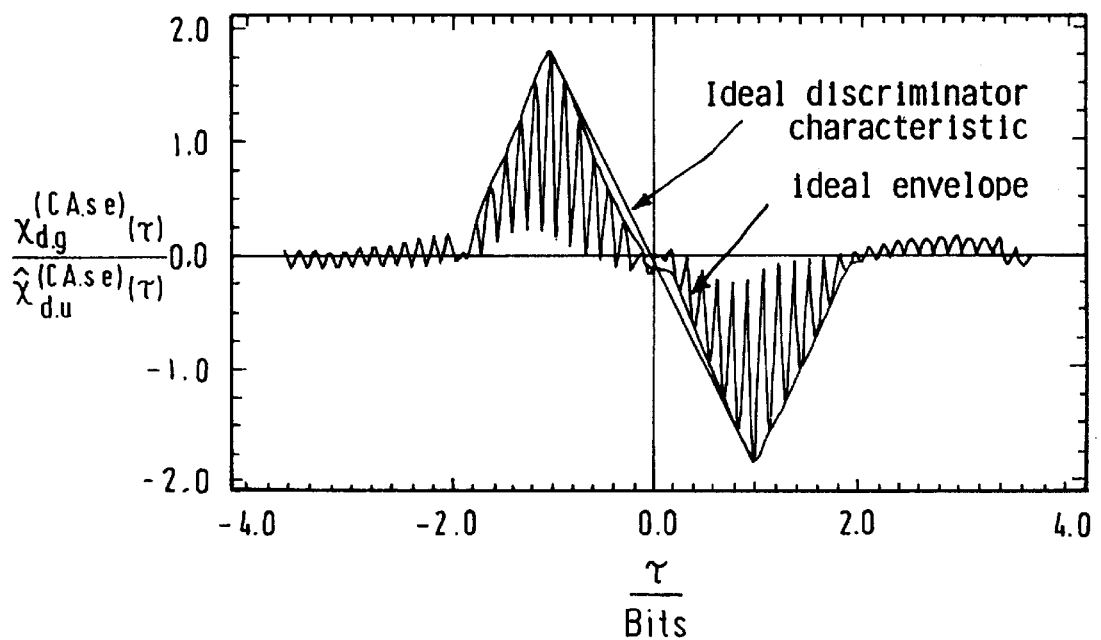
FIG. 19 labeled "prior art" is a graphical view of a discriminator characteristic of the DLL of FIG. 1 with a $9\pi/5$ carrier-phase shift and an amplitude ratio of 0.9.

FIGS. 10 and 11 illustrate the behavior of the DLL when one signal is superposed on another signal and where the phase shift is in the pseudo-noise code and the carrier, respectively. This simulates the delay or phase shift of the two signals caused by multipatch propagation.

FIGS. 4 through 20 show several examples of superposing a direct satellite signal with an identical signal that has been phase shifted. The phase shift affects both the phase of the pseudo-noise signal and also the phase of the carrier.

The figures show superposition not of carrier-frequency waves, but down-converted waves on an intermediate frequency obtained by mixing or modulating the carrier wave. In FIGS. 4 through 20 the cross-correlation function of the disturbed satellite signal, the pseudo-noise code generated in the receiver, the discriminator characteristic of the DLL, which is generated from this as an ideal envelope, and the synthetically-generated discriminator characteristic are always shown in the intermediate-frequency plane.

The horizontal axis represents the phase shift time in unit of bits, where a bit represents the period of the pseudo-random noise sequence. At $(\tau/\text{Bits})=0$, the waves are in phase; at $(\tau/\text{Bits})=\pm 1$, the pseudo-random sequences of the two waves are shifted by one period and the magnitude of the cross-correlation reaches a maximum.

The intermediate frequency correlation appears as the fine looping structure of which is enclosed by the "ideal envelope".

As already mentioned, the course of the characteristic is the member responsible for the error in the pseudo-travel time measurement. The spacing of the two pseudo-noise codes is always identical for the comparison of the individual diagrams in FIGS. 4 through 20:

$$t_v = 1.0 \text{ bits}, \qquad (6)$$

where $t_v$ is the time difference between two internally-generated codes necessary for determining the discriminator characteristic.

Figure 4:
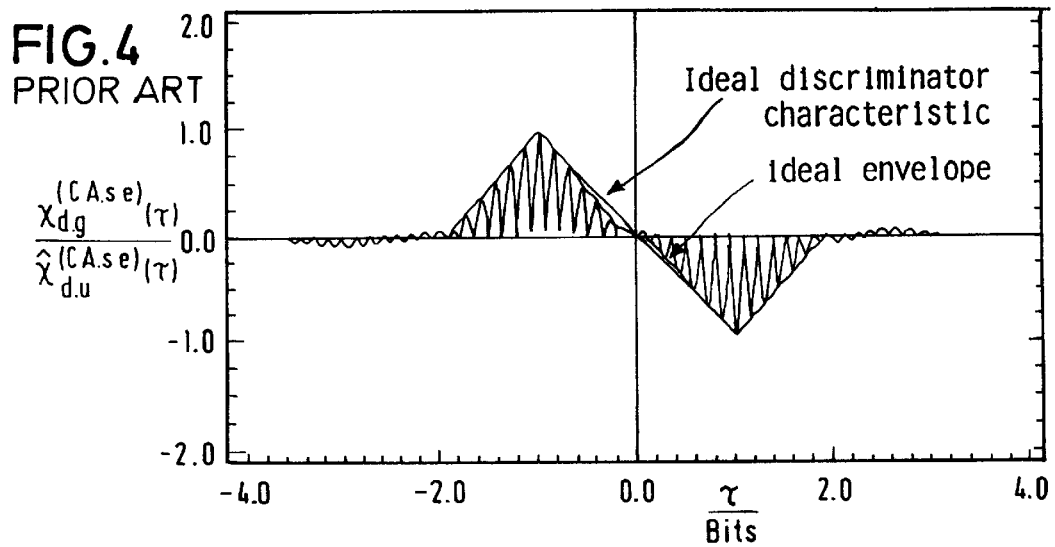
FIG. 4 labeled "prior art" is a graphical view of a discriminator characteristic of the DLL of Equation (3) with a symmetrical temporal shift according to Equation (6)
Figure 5:
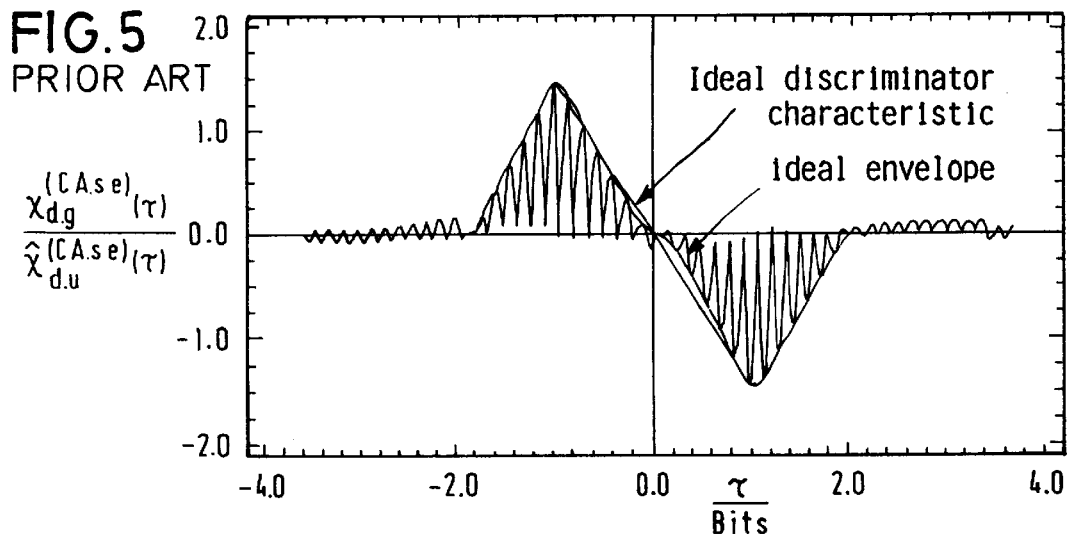
FIG. 5 labeled "prior art" is a graphical view of a discriminator characteristic of the DLL of FIG. 1 with a 0.1-bit code-D phase shift and an amplitude ratio of 0.5.
Figure 6:
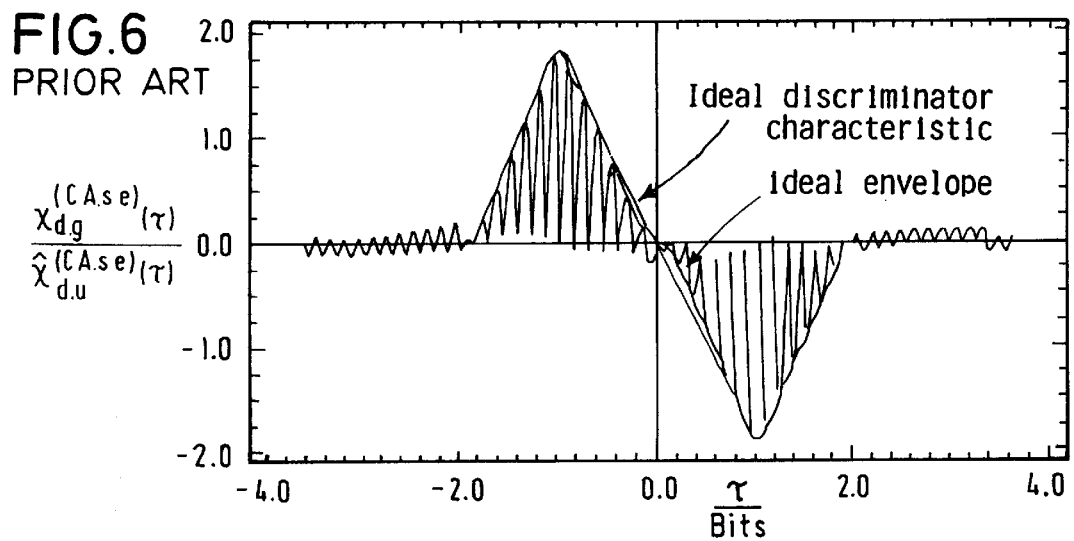
FIG. 6 labeled "prior art" is a graphical view of a discriminator characteristic of the DLL of FIG. 1 with a 0.1-bit code-phase shift and an amplitude ratio of 0.9.
Figure 7:
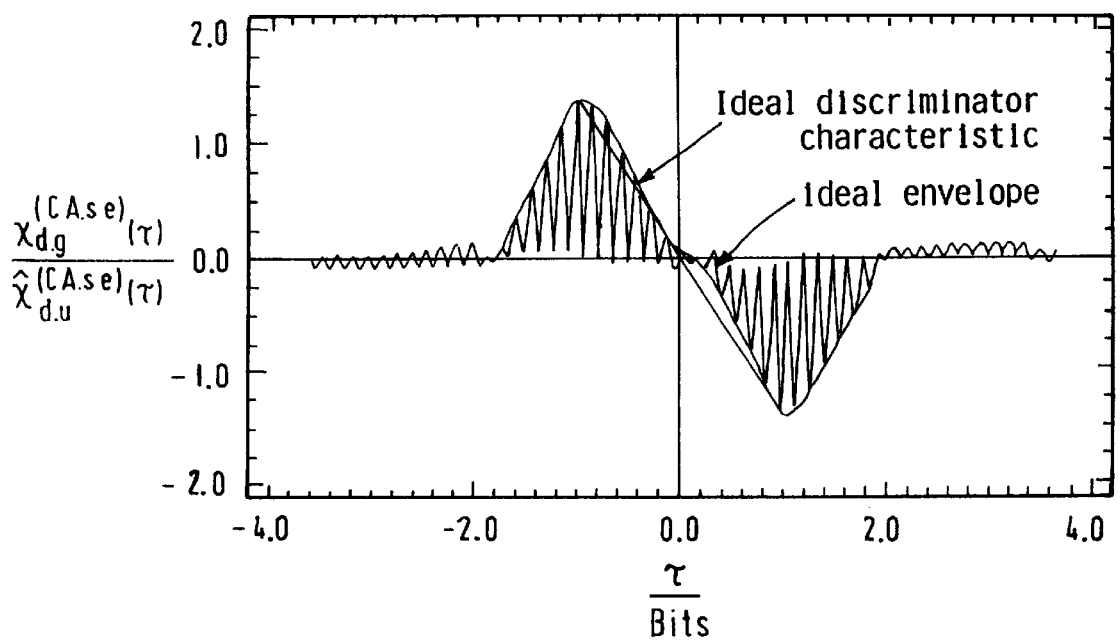
FIG. 7 labeled "prior art" is a graphical view of a discriminator characteristic of the DLL of FIG. 1 with a 0.25-bit code-phase shift and an amplitude ratio of 0.5.
Figure 8:
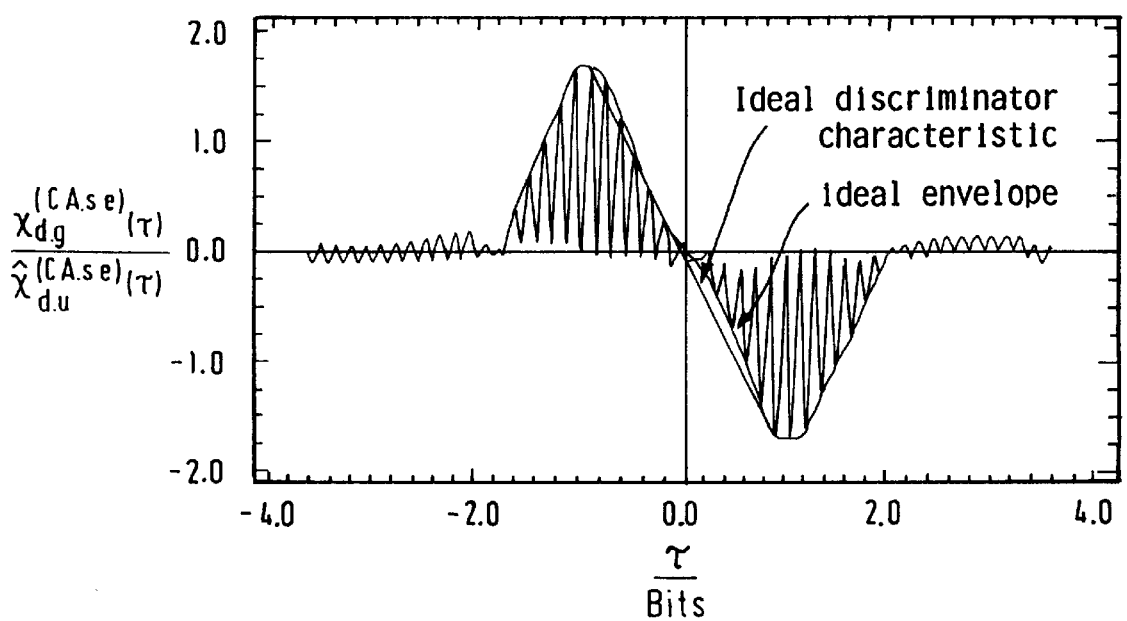
FIG. 8 labeled "prior art" is a graphical view of a discriminator characteristic of the DLL of FIG. 1 with a 0.25-bit code-phase shift and an amplitude ratio of 0.9.
Figure 9:
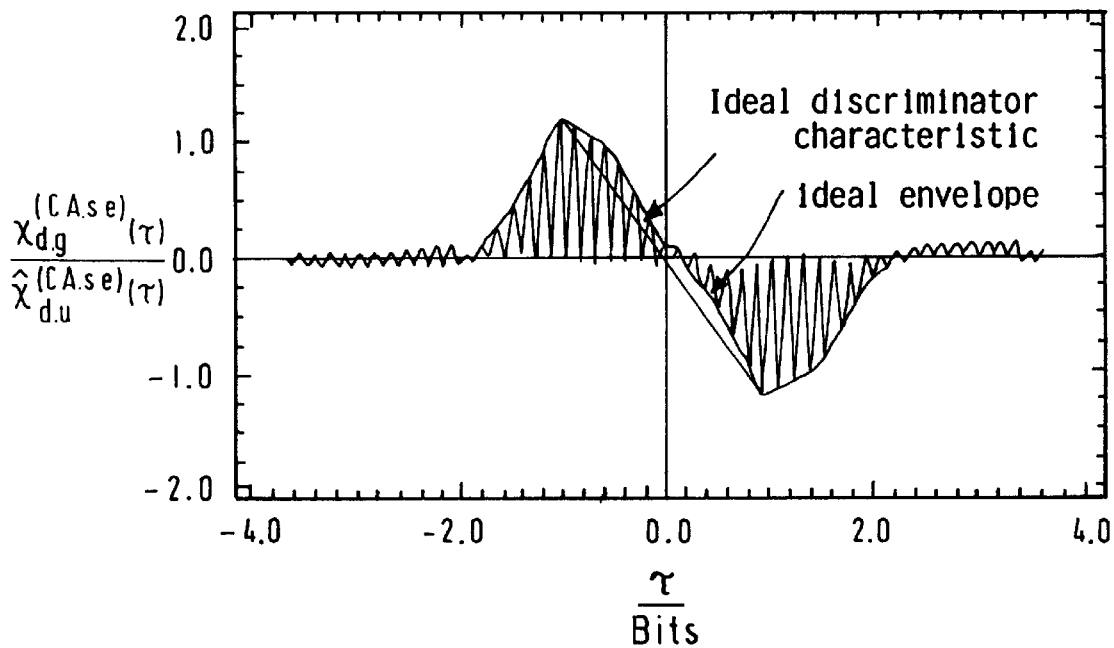
FIG. 9 labeled "prior art" is a graphical view of a discriminator characteristic of the DLL of FIG. 1 with a 0.5-bit code-phase shift and an amplitude ratio of 0.5.

FIG. 4 shows the correlation function in an undisturbed reception of the satellite navigation signal. The control point of the undisturbed signal is always in the center of the diagram in FIGS. 5 through 20. The deviation from the undisturbed control point in FIG. 4 is the error in the pseudo-travel time measurement that results from the time measurement with the DLL. $S_{01}{}^{e_u(L_1 \cdot CA)}(t)$ represents an undisturbed pseudo-random signal (PRN: Pseudo-Random Noise) of a satellite 01, i.e., an undisturbed PRN01 signal in the carrier-frequency plane, with $e_u$ representing an undisturbed signal;

$S_{01}{}^{e_v(L_1 \cdot CA)}(t)$ represents the PRN01 signal in the carrier-frequency plane that has been shifted in the code phase and/or the carrier phase, with $e_v$ representing the disturbed signal;

$\phi_{01}^{(e.CA)}$ represents the phase shift of the pseudo-noise signal PRN01;

$\phi_{01}^{(e.L_1)}$ represents the phase shift in the L1 carrier frequency, with L1 indicating a first GPS carrier frequency in the L band (frequency: 1.57542 GHz, bandwidth: 2.046 MHz, signal power on earth: −163 dBW);

$\chi d.u^{(CA.se)}(\tau)$ represents the discriminator characteristic of the undisturbed satellite signal, with se representing the two relevant signals, that is, the received signal (s) and the signal (e) that is generated in the receiver, and d.u representing the undisturbed signal;

$\chi d.g^{(CA.se)}(\tau)$ represents the discriminator characteristic of the disturbed total signal, with d.g representing the disturbed signal; and $\tau_g$ represents the error in the travel-time measurement that is caused by the disturbed signal.

The following description first deals with the influence of superposing a pseudo-noise signal in a signal that has been shifted onto the phase of the pseudo-noise code. The phase of the two carriers is coherent with a phase difference of 0. FIGS. 5 through 14 show the results of the simulations with different phase shifts and disturbance amplitudes.

Table 1 shows a simulation of the superposing of an undisturbed PRN01 signal with a PRN01 signal that has been shifted in the code phase; here the error $\tau_g$ of a standard DLL is shown in meters (m).

TABLE 1

| $\phi_{01}^{(e.CA)}$ Bit | $\phi_{01}^{(e.L_1)}$ rad | $\dfrac{\hat{S}_{01}^{e_v(L_1.CA)}(t)}{\hat{S}_{01}^{e_u(L_1.CA)}(t)}$ | $\dfrac{\hat{\chi}_{d.g}^{(CA.se)}(\tau)}{\hat{\chi}_{d.u}^{(CA.se)}(\tau)}$ | $\tau_g$ m | FIG. |
|---|---|---|---|---|---|
| 0.1 | 0 | 0.5 | 1.45 | 12.3 | 5 |
| 0.25 | 0 | 0.5 | 1.39 | 28.1 | 6 |
| 0.5 | 0 | 0.5 | 1.21 | 43.9 | 7 |
| 0.75 | 0 | 0.5 | 1.08 | 73.8 | 8 |
| 0.9 | 0 | 0.5 | 0.97 | 112.5 | 9 |
| 0.1 | 0 | 0.9 | 1.85 | 12.3 | 10 |
| 0.25 | 0 | 0.9 | 1.70 | 19.3 | 11 |
| 0.5 | 0 | 0.9 | 1.43 | 82.6 | 12 |
| 0.75 | 0 | 0.9 | 1.15 | 116.0 | 13 |
| 0.9 | 0 | 0.9 | 0.98 | 130.0 | 14 |

The time $t_v$ is the difference between the two internally-generated pseudo-noise codes required for generating the discriminator characteristic. In contrast, $t_m$ is the real measured pseudo-signal travel time.

A comparison of FIGS. 5 through 14 clearly shows that the superposing of an undisturbed signal with a signal that has been shifted in the code phase dramatically changes the amplitude and the shape of the standard-discriminator characteristic (ideal envelope). As dictated by the change in shape, the control point is shifted with respect to the undisturbed characteristic, resulting in the erroneous measurement of the pseudo-signal travel time caused by multi-path propagation. The magnitude of the error is dependent on the amplitude of the disturbed signal, as well as on the shift of the code phase. The course of the synthetically-generated characteristic shown in the drawings clearly demonstrates that resulting errors are virtually negligible.

FIGS. 15 through 19 show several standard-discriminator characteristics in a superposing of an undisturbed satellite signal with a signal that is identical but shifted in the carrier phase. The code phase of the two signals is coherent with the phase shift zero. In the region surrounding the phase opposition, the phase difference in the carrier significantly influences the amplitude of the control characteristic, which nearly becomes zero (FIG. 17 and Table 2) at $\pi$ and an amplitude ratio of 0.9.

Corresponding to Table 1, Table 2 also shows a simulation of the superposing of an undisturbed PRN01 signal in a PRN01 signal that has been shifted in the carrier phase; Table 2 also shows the error $t_g$ of a standard DLL in meters (m).

The errors in the travel-time measurements, which are between about 20 and 50 meters, are not as heavily influenced by the carrier-phase difference of the disturbed signal as is the case in the code-phase difference of the disturbed signal. However, due to the attenuation in the amplitude of the discriminator characteristic, the control point can no longer be determined precisely, and the pseudo-travel time measurement begins to be affected by noise.

TABLE 2

| $\phi_{01}^{(e.CA)}$ Bit | $\phi_{01}^{(e.L_1)}$ rad | $\dfrac{\hat{S}_{01}^{e_v(L_1.CA)}(t)}{\hat{S}_{01}^{e_u(L_1.CA)}(t)}$ | $\dfrac{\hat{\chi}_{d.g}^{(CA.se)}(\tau)}{\hat{\chi}_{d.u}^{(CA.se)}(\tau)}$ | $\tau_g$ m | FIG. |
|---|---|---|---|---|---|
| 0 | $\pi/5$ | 0.9 | 1.79 | −33.4 | 15 |
| 0 | $\pi/2$ | 0.9 | 1.32 | −40.4 | 16 |
| 0 | $\pi$ | 0.9 | 0.09 | −24.6 | 17 |
| 0 | $3\pi/2$ | 0.9 | 1.34 | −58.0 | 18 |
| 0 | $9\pi/5$ | 0.9 | 1.82 | −22.8 | 19 |
| 0.85 | $\pi$ | 0.9 | 0.98 | 121.2 | 20 |

Figure 20:
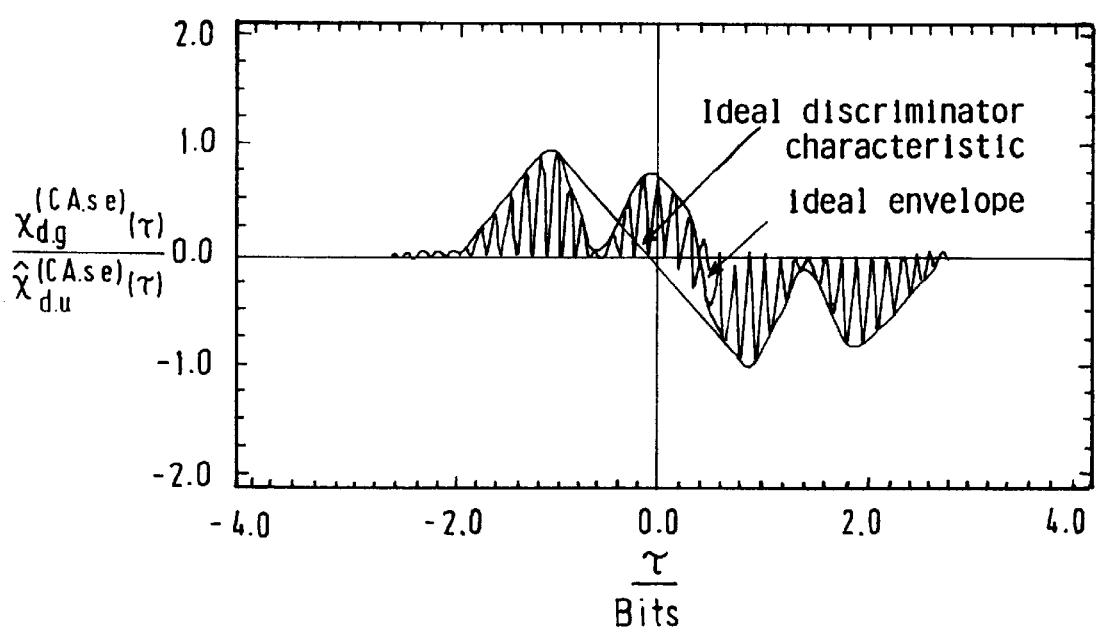
FIG. 20 labeled "prior art" is a graphical view of a discriminator characteristic of the DLL of FIG. 1 with a $\pi$ carrier-phase shift, a 0.85-bit code-phase shift and a disturbance signal amplitude ratio of 0.9.

If differences in code phase and carrier phase between the disturbed signal and the undisturbed useful satellite signal occur simultaneously, which is normally always the case in reality, the discriminator characteristic can be deformed such that even a plurality of zero points occurs (FIG. 20). However, in all of these cases, the immune DLL (MIDLL) operating with the synthetically-generated discriminator characteristic supplies a virtually error-free measured value.

As can clearly be seen in FIGS. 4 through 20, the use of the DLL that is immune to multi-path propagation (MIDLL) renders the influence of multi-path propagation on the travel-time measured values negligible. To explain this, the synthetically-generated discriminator characteristics are shown in addition to the envelopes. Here Tables 1 and 2 show the resulting errors $\tau_g$ of a standard DLL for the conditions illustrated in FIGS. 4 through 20. The resulting error in the pseudo-travel time measurement of the MIDLL operating with the synthetically-generated characteristic is therefore virtually zero with respect to multi-path propagation, even under extreme conditions, so essentially an error no longer exists. Although a correlation spacing according to Equation (5) has been selected in the simulations, in principle the correlation spacing can assume any arbitrary value.

Figure 23:
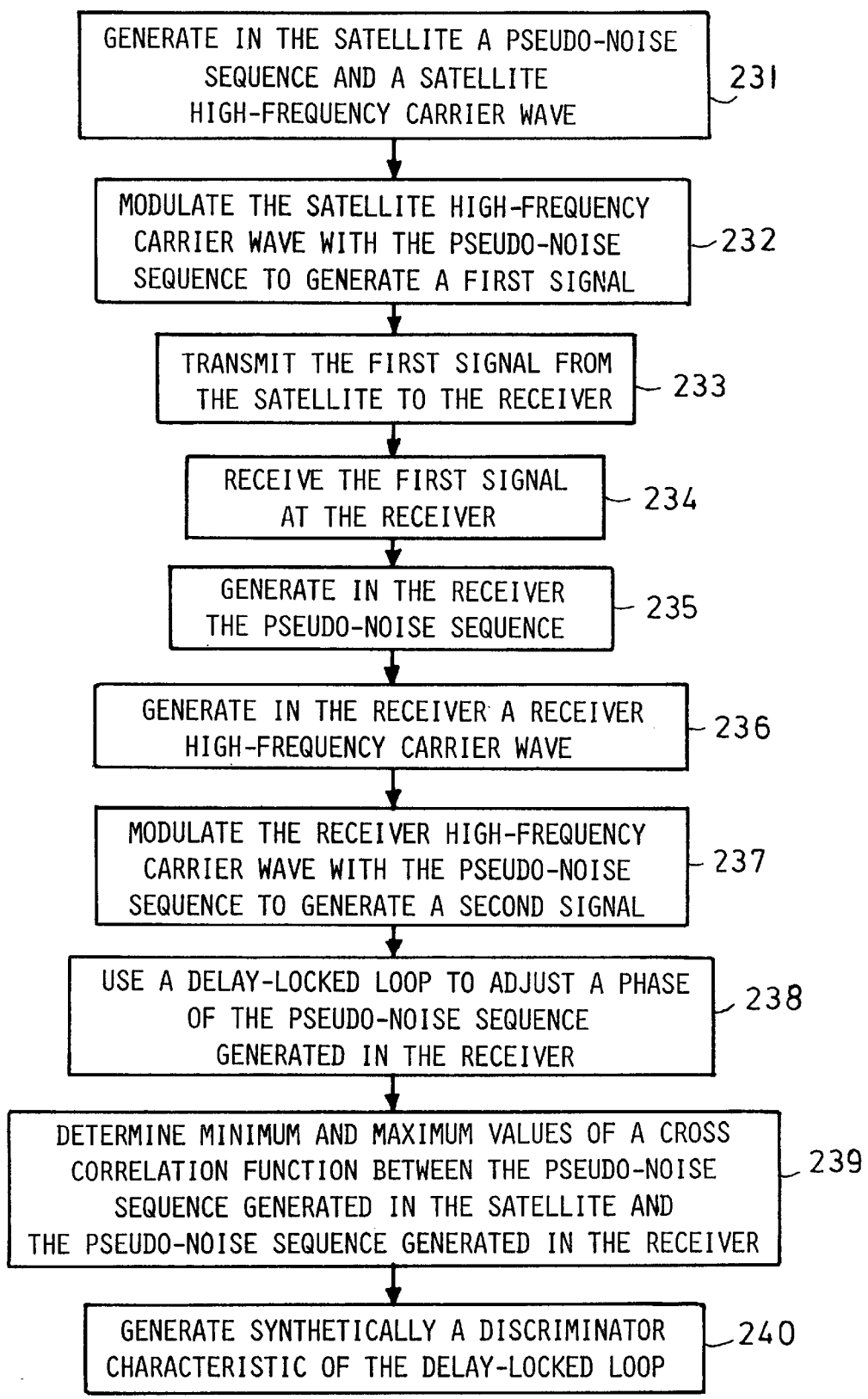
FIG. 23 is a block diagram of the features of the Satellite Navigation Receiver System.

FIG. 23 is a flow diagram of an embodiment of of the Satellite System Navigation Receiver System of the present invention, in which the following operations are carried out.

Generate in the satellite a pseudo-noise sequence and a satellite high-frequency carrier wave, 231. Then, modulate the satellite high-frequency carrier wave with the pseudo-noise sequence to generate a first signal, 232. Transmit the first signal from the satellite to the receiver 233. The first signal is received at the receiver, 234. The pseudo-noise sequence is then generated in the receiver, 235. A receiver high-frequency carrier wave is generated in the receiver, 236. The receiver high-frequency carrier wave is modulated with the pseudo-noise sequence to generate a second signal, 237. A delay-locked loop is used to adjust a phase of the pseudo-noise sequence generated in the receiver, 238. The minimum and maximum values of a cross correlation function between the pseudo-noise sequence generated in the satellite and the pseudo-noise sequence generated in the receiver are determined, 239. Finally, a discriminator characteristic of the delay-locked loop is generated, 240.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. In a method of measuring a distance from a satellite to a receiver by determining a direct-path signal real travel time of a signal from the satellite to the receiver; the method including generating in the satellite a pseudo-noise sequence and a satellite high-frequency carrier wave;

modulating the satellite high-frequency carrier wave with the pseudo-noise sequence to generate a first signal;

transmitting the first signal from the satellite to the receiver;

receiving the first signal at the receiver;

generating in the receiver a pseudo-noise sequence;

generating in the receiver a receiver high-frequency carrier wave;

modulating the receiver generated high-frequency carrier wave with the receiver generated pseudo-noise sequence to generate a second signal;

using a delay-locked loop to adjust a phase of the pseudo-noise sequence generated in the receiver to reduce a phase shift between the pseudo-noise sequence generated in the satellite and the pseudo-noise sequence generated in the receiver;

the improvement comprising:

determining minimum and maximum values of a cross correlation function between the pseudo-noise sequence generated in the satellite and the pseudo-noise sequence generated in the receiver and synthetically generating a discriminator characteristic of the delay-locked loop, the discriminator characteristic including a determined curve passing through at least one of a minimum value and a maximum value of the cross correlation function;

whereby the delay-locked loop is resistant to unlocking and immune to multi-path propagation.

2. The method according to claim 1, wherein the determined curve connects an adjacent pair of minimum and maximum values.

3. The method according to claim 1, wherein the determined curve is a straight line.

4. The method according to claim 1, wherein a slope of the determined curve is a function of a desired dynamic response of the delay-locked loop.

5. The method according to claim 2, wherein a slope of the determined curve is a function of a desired dynamic response of the delay-locked loop.

6. The method according to claim 3, wherein the determined curve passes through the maximum value of the cross correlation function.

* * * * *